(12) United States Patent
Higbee

(10) Patent No.: US 10,477,271 B1
(45) Date of Patent: Nov. 12, 2019

(54) SYSTEM AND METHOD FOR GENERATING REAL-TIME, EVENT AND USER-BASED RESPONSES AND ANALYTICS

(71) Applicant: OPINE INC., Lehi, UT (US)

(72) Inventor: Joseph Higbee, Frederick, MD (US)

(73) Assignee: Opine Inc., Lehi, UT (US)

( * ) Notice: Subject to any disclaimer, the term of this patent is extended or adjusted under 35 U.S.C. 154(b) by 0 days.

(21) Appl. No.: 15/782,440

(22) Filed: Oct. 12, 2017

Related U.S. Application Data

(60) Provisional application No. 62/407,239, filed on Oct. 12, 2016.

(51) Int. Cl.
*H04N 21/442* (2011.01)
*H04N 21/462* (2011.01)
(Continued)

(52) U.S. Cl.
CPC ... *H04N 21/44222* (2013.01); *H04N 21/2187* (2013.01); *H04N 21/4307* (2013.01);
(Continued)

(58) Field of Classification Search
CPC ............. H04N 21/2187; H04N 21/812; H04N 21/44008; H04N 21/4788; H04N 21/8133; H04N 21/44204; H04N 21/4532
See application file for complete search history.

(56) References Cited

U.S. PATENT DOCUMENTS 7,289,793 B2  10/2007  Norwood et al.
7,921,369 B2   4/2011  Bill
(Continued)

FOREIGN PATENT DOCUMENTS

WO   2015024003 A2   2/2015

OTHER PUBLICATIONS

TechCrunch, "Polly's teen polling app piggybacks on Snapchat", Web Page <https://techcrunch.com>, 9 pages, posted Sep. 20, 2017, retrieved from <https://techcrunch.com/2017/09/20/polly-polls> on Oct. 11, 2017.
(Continued)

*Primary Examiner* — Hsiungfei Peng
(74) *Attorney, Agent, or Firm* — Hunton Andrews Kurth LLP

(57) ABSTRACT

The invention relates to a computer implemented system and method for compiling real-time user emotion data in connection with an event as the event is taking place, then aligning targeted communications based on that data. The method may comprise the steps of: providing a user interface for a personal computing device enabling a user to publish statements and provide real-time responses to an event, wherein the user interface receives real-time responses from the user as unstructured text or a selected response; receiving the user's real-time responses; recording response content, response timing, bio data and a user location for the user's real-time responses; compiling the user's real time responses with responses from other users in a group to generate aggregated response data; distributing the aggregated response data to the group; generating real-time emotion data for the user, and sending a targeted communication to the user based on the real-time emotion data.

7 Claims, 20 Drawing Sheets

(51) Int. Cl.
*H04N 21/4788* (2011.01)
*H04N 21/43* (2011.01)
*H04N 21/2187* (2011.01)
*H04N 21/81* (2011.01)
*H04N 21/8547* (2011.01)

(52) U.S. Cl.
CPC ..... *H04N 21/4622* (2013.01); *H04N 21/4788* (2013.01); *H04N 21/8133* (2013.01); *H04N 21/8547* (2013.01)

(56) References Cited

U.S. PATENT DOCUMENTS

| | | |
|---|---|---|
| 8,567,676 B2 | 10/2013 | Howcroft et al. |
| 9,553,834 B2 | 1/2017 | Abadir |
| 9,754,013 B2 | 9/2017 | Barthel et al. |
| 9,756,492 B1 | 9/2017 | Dudarev et al. |
| 2010/0325135 A1 | 12/2010 | Chen et al. |
| 2012/0143914 A1 | 6/2012 | Lang et al. |
| 2013/0080348 A1* | 3/2013 | Pantaliano ............ G06Q 30/02 705/347 |
| 2014/0025620 A1 | 1/2014 | Greenzeiger et al. |
| 2014/0100944 A1 | 4/2014 | Zhu et al. |
| 2014/0180986 A1 | 6/2014 | Hinton et al. |
| 2014/0229962 A1 | 8/2014 | Findlay |
| 2014/0279056 A1 | 9/2014 | Sullivan et al. |
| 2015/0088622 A1* | 3/2015 | Ganschow ............. G06Q 50/01 705/14.5 |
| 2015/0099586 A1 | 4/2015 | Huang et al. |
| 2015/0178383 A1 | 6/2015 | Corrado et al. |
| 2016/0054826 A1 | 2/2016 | Huppi et al. |

OTHER PUBLICATIONS

TechCrunch, "Instagram Stories mimics Polly with new polls", Web Page <https://techcrunch.com>, 15 pages, posted Oct. 3, 2017, retrieved from <https://techcrunch.com/2017/10/3/instagram-stories-mimic-polly-with-new-polls/> on Oct. 11, 2017.

* cited by examiner

SYSTEM AND METHOD FOR GENERATING REAL-TIME, EVENT AND USER-BASED RESPONSES AND ANALYTICS

CROSS-REFERENCE TO RELATED APPLICATIONS

The present application claims the benefit of U.S. Provisional Application No. 62/407,239, filed Oct. 12, 2016, which is hereby incorporated by reference in its entirety.

FIELD OF THE INVENTION

The present invention relates generally to systems and methods for creating real-time event and user-based responses and analytics through a shared social media experience and using them to align communications to specific users and groups of users.

BACKGROUND

Live events and activities attract much attention—in person and through media. For example, live sporting events continue to be a popular method of entertainment among the masses, among advertisers, and among those who engage on social media. An example can be seen from the steep increase of Super Bowl viewership and the more than 137 million viewers of NFL games each year. Even more people watch episodes of streamed movies, TV shows, recorded or live events, yet while they do it, they are fully unaware of others who are at the same time consuming the same event or activity. As part of this viewership, more information about the plays, players, actors, participants and context is being captured and made available. Examples of streamed or broadcasted events or media which are delayed or recorded include eSports, political debates and other types of entertainment such as streaming personal videos or published images. Almost anything can now be "live" to a viewer. Over the past decade, there has been a significant increase in the investment, interest and depth of data and analytics for sports, eSports, and any other type of entertainment-focused fan.

All of this data increases fan and consumer knowledge of what is happening on the field, behind the scenes, on the screen, in the competition or amidst a broadcast. Yet, the consumer's real-time opinion hasn't received equal attention. There is currently no digital platform that enables fans of a show, a team, a sport, a game, activity or event to express their real-time, micro-moment opinions with groups of friends then in real time be able to quantitatively analyze those responses. In sports, for example, where officials have significant subjectivity in the fouls or other decisions they call, fans commonly have very different and many times unresolvable viewpoints. But fans don't have a platform on which they can express their immediate, subjective views of the officiating of a sporting event and then quickly understand the viewpoint of hundreds, thousands, millions of others regarding that same "micro-moment." In eSports, fans have opinions of what actions players should be making or could have been taken. Yet, they are unable to quickly express these opinions in the moment. In the event of fans watching talent, variety or award shows, or even entertaining dramas, where these viewers have opinions about what is happening as they watch, they are limited by current methods by expressing their opinion via qualitative means—by texting out their opinion. It is also difficult to quickly and clearly understand the opinions of others as consuming the typed, qualitative expressions of others is timely and can't be done to truly understand opinion of a "micro-moment" from a mass audience—or even a small audience in quick, back-to-back time frames, as occurs frequently in live events or activities. These and other drawbacks exist with known technologies.

SUMMARY

The invention relates to a method for generating real-time event content and receiving user responses, then quickly making those user responses consumable so in a matter of seconds understanding can be had—by audiences of any size—of the opinions of individuals as well as the masses. According to one embodiment, the method comprises the steps of providing a user interface for a personal computing device, wherein the user interface enables a user to identify at least one event that the user will observe and to provide real-time responses to activity that occurs within or throughout the at least one event as the event is taking place, wherein the user interface is designed to receive real-time responses from the user in the form of unstructured text, an image, GIF, or a video, and a selected response from a set of options; it as well may receive biological data, or sensory data; receiving the user's identification as to the at least one event that the user will observe; receiving the user's real-time responses to the event; for the user's real-time responses, recording response content, response timing, and a user location; compiling the user's real time responses with real time responses from other users in a group of users to generate aggregated response data; distributing the aggregated response data to the users in the group of users; generating real-time emotion data for the user based on the user's real-time responses; and sending a targeted communication to the user based on the real-time emotion data.

The invention also relates to a computer-implemented system for compiling real-time user emotion data in connection with an event as the event is taking place, and to a computer readable medium containing program instructions for executing a method for compiling real-time user emotion data in connection with an event as the event is taking place.

By users digitally raising their hand when they see something in an event that raises concern or surprise, analysis of user-generate input can be assessed and the activity which was of concern to users, that caused them to digitally raise their hand can be automatically generated in a description on which users can respond. Additionally, a unique programmatic advertising platform can be combined with these user opinions so real-time user response to real-time micro-moment activity in an event is rapidly analyzed with other user data to align real-time ad buying with the real-time emotional state of the user. In addition, a unique method of distributing ads to groups of individuals is set forth, in that the effectual use of a coupon is distributed to a number of potential customers, such as a puzzle only complete when all the pieces are combined. The analysis of the individuals and the group define the distribution of the number and the types of pieces of a coupon ad, and how they must be combined for the individuals of the group to jointly receive the value of the coupon upon submission for redemption.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Figure 1:
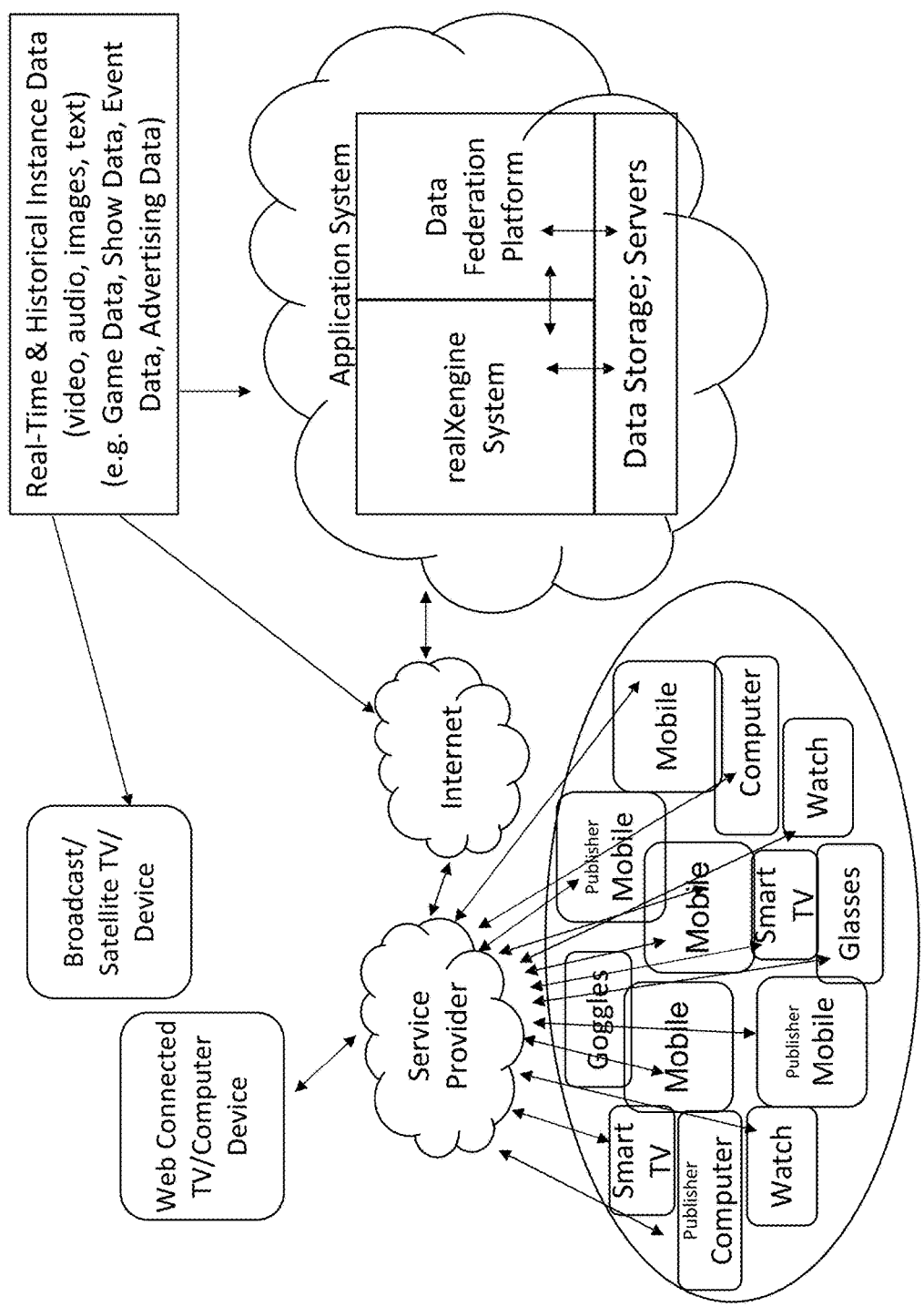
FIG. 1 is diagram of a system for generating real-time user responses and analytics according to an exemplary embodiment of the invention.

The invention relates to a system and method for real time or time-sensitive generation of user responses and for analytics of such user responses and the use of them to enhance communication. The system, which may be referred to as the user response and analytics system ("URA System"), can be used in various environments, such as sporting events, political debates, television shows, movies and other events, where users are interested in sharing their opinions and understanding the opinions of others on various issues in real time or near real time as they are consuming the media or the in-person activity. As used herein, the term "real-time" generally refers to activities that occur in real time or near real time during a live event such as a sporting event, or during the viewing of a recorded event such as a movie (e.g., two users generate real-time responses while they are both watching the same movie). According to a preferred embodiment in the sports environment, the URA System comprises a social media, sports fan response and analytics platform built for real-time communication and analysis of individuals' and groups' opinions during a sporting event, about play calls made by referees. According to this embodiment, the URA System provides an easy way for individuals, friends and family to express their opinions in micro-moments about plays/referee calls or the opinions of others in real time, and then compare their response data with each other, with experts and with others based on a number of factors. For simplicity, the following discussion will describe the sports environment; however, those skilled in the art will appreciate that the URA System has application in a number of other environments where users are interested in sharing their opinions and consuming the opinions of others in real time or near real time to when they consume the event or activity.

According to an exemplary embodiment of the invention, users of the URA System are sports fans who may use their mobile device or digital watch to engage in activity related to a sporting event, while watching that sporting event, e.g., in arena, on TV, on their mobile device, via augmented or virtual reality glasses/goggles or on a similar device. For fans, the URA System facilitates quick voting on a play just whistled by a referee—before replay, and then potentially again after replay. It also facilitates feeds of input from others on which viewers may vote their opinion. The system allows for both ongoing and spontaneously-generated groups consuming similar events to gather digitally (including geo-based groupings—e.g., in the arena or in a specific restaurant/bar, arena, city, etc.). Fans can analyze their opinions in light of the responses of others in their groups—in real time and over periods of time. This is supported on the device via app, but also in a browser-based setting for further analysis of individual and group responses.

According to an exemplary embodiment of the invention, the URA System allows fans to express their opinions on how plays in a game are officiated, or on other activities related or beyond the game/event. The system provides functionality to gather opinions on plays immediately and after replay, respond to questions or statements in context of the event and it enables its users to compare opinions across data points, including through a social perspective. The ability to be entertained by watching the sport and to socialize via a device provides a fan the experience of engagement in the sporting event and social engagement all at once. The ability for information to be published, on which users can vote their opinion, represents a baseline upon which the URA system builds. The system analyzes these inputs via deep learning mechanisms. The output of the learning is supplied in the form of artificial intelligence—statements on which other users can vote—that is an output of assessing the information originally published as material on which users could vote/opinionate.

In addition to the fan benefits provided by URA System, the system can create value for sports franchises, their sponsors, arenas, advertisers, and media outlets, for example. With the URA System, real-time fan sentiment data is readily available, opening opportunities to match emotions and sentiment to specific fans at specific times in specific locations.

The URA System can also generate specialized advertising opportunities. The system can be configured to offer subscription to data at different levels, uniquely made available at precise times and in specific places to stakeholders, including users, fans, teams, sponsors, advertisers, media outlets, and location-based establishments, including arenas. Using a varying mixture of time, geo-based and digital social interaction opens new opportunities for engagement amongst all of these stakeholders. The URA System can create value for stakeholders by driving adoption and use of the system to a large pool of users by increasing fans' functional, emotional and communal engagement during sports "micro-moments."

The URA System can facilitate and enhance engagement with fans. For example, consider fans watching a particular football game. The whistle blows—or maybe it doesn't. The fans are intently focused on the play, which presents an opportunity for engagement. The URA System can facilitate that engagement by providing a platform to allow the fans to express their opinions as to whether there was a foul, including before replay and after replay. Any other type of basis is available for the fan to be prompted or share their opinion by vote or social expression. The URA System can also facilitate engagement by providing additional data to the fans, such as data on the opinions of friends or other defined groups, variations in how the play was perceived by fans in the arena vs. TV watchers, perceptions of fans in the home town of the visiting team, and many other forms of data or information.

While conventional sports analytics measure on court/field reality, the URA System can generate and provide a new and valuable type of data, e.g., fan attitudes and perceptions. It can be measured in the moment of a play or afterwards. It can be shared and assessed. Fan attitudes during micro-moments in a game can be captured and used to engage fans, to gain insights, and to facilitate additional fan expressions. The data can be cross-analyzed for individual, group or global patterns or trends.

According to one embodiment of the invention, the URA System provides three primary functionalities: (1) a system for instantly gathering and displaying to users real-time game plays, statements or questions on which to vote; (2) a system for collecting, analyzing and presenting back to users requested real-time user data; and (3) an ad platform that uses real-time user input data and real-time game data to serve real-time, logic-based purchased ads to targeted users.

Fans who are users of the URA System may find significant value in this ability to post and see posts related to what they are currently watching. The ability to be entertained by watching the sport and to socialize provides a fan the joint experience of engagement in the watching of the sporting event and in the social engagement all at once. Social media has filled the role of socializing by shifting time (posting and others reading when they want) and shifting location (you post or read from wherever you want) while still conversing on the same topic. Taking that digital conversation into real time and allowing those involved in the conversation to be limited or expanded based on geo-location, interest or topic opens the door to a variety of opportunities. Usually timing, location, or social engagement are a focus of an application. When all three aspects are brought together, a new variety of social experience can be enjoyed—mixing real-life in-person situations with real-life digital situations in real-time, with socialization, with location. The awareness of what can happen when mixing timing, location and sociality in a digital application opens opportunities in the live sporting and other event markets. The URA System is designed to take advantage of this by, for some, linking together real-time, location-based social engagement (both digital and in-person), according to exemplary embodiments of the invention.

Other features and advantages that exemplary embodiments of the invention can provide include (1) facilitating real-time data from events for real time voting; (2) capturing real-time voting intensity; (3) grouping real time votes from people in their real time geo locations, based on interest, timing of consumption, or history; (4) providing individual and group data analytics to people based on their location and group membership; (5) identifying user emotion based on preference, profile, history mixed with engagement behavior and location; (6) providing an ad platform where buyers can purchase based on a mixture of geography, demographics, preferences and real-time emotion; (7) overlaying real-time voting on top of real-time streaming on the device screen; and (8) enabling various ways of publishing comments, questions or statements on which users can vote.

An example of the URA System will now be described with reference to the drawings.

FIG. 1 is diagram of a system for generating real-time fan-based responses and analytics according to an exemplary embodiment of the invention. The system may include an application system consisting of one or more servers and databases, and a software engine capable of receiving and analyzing user input with live event data along with other inputs via the applications system's sub-systems. Live or real time events are broadcast or delivered through web-enabled devices for viewing by users. Additionally, live event data can be delivered through the application system. Many mobile devices or other devices access the real time event data via the application system. Such devices may include, for example, smart phones, smart TVs, game consoles, tablets PCs, laptop computers, desktop computers, etc. configured to run software over a network such as the internet. The application system is also what ingests data provided by mobile users or users of other web/connected devices. The application system analyzes user input with live event data along with other inputs via the application system's sub-systems (such as the ad platform.). Communication continues to and from the mobile or web-enabled devices and the application system. The system not only enables user functionality but also publisher functionality. Publisher functionality is information sent by users on which other users can vote. Publisher-provided information on which users can vote may be pushed remotely, back into the URA system, via the service provider and the internet, from a connected device, such as a Laptop, PC computer or mobile device. The system may facilitate users to interact with other users and to provide sports event related feedback to the application system. The application system may provide a variety of real-time, fan-based statistics based on the collective feedback provided by the users. Advantageous functions that can be provided by the URA System include the development of real-time customer understanding according to user voting, historical, preference, group membership, publisher following geography and other data for the purpose of providing users with fitting advertising communications and advertisers with uniquely fitted opportunities to communicate their offerings.

Figure 2:
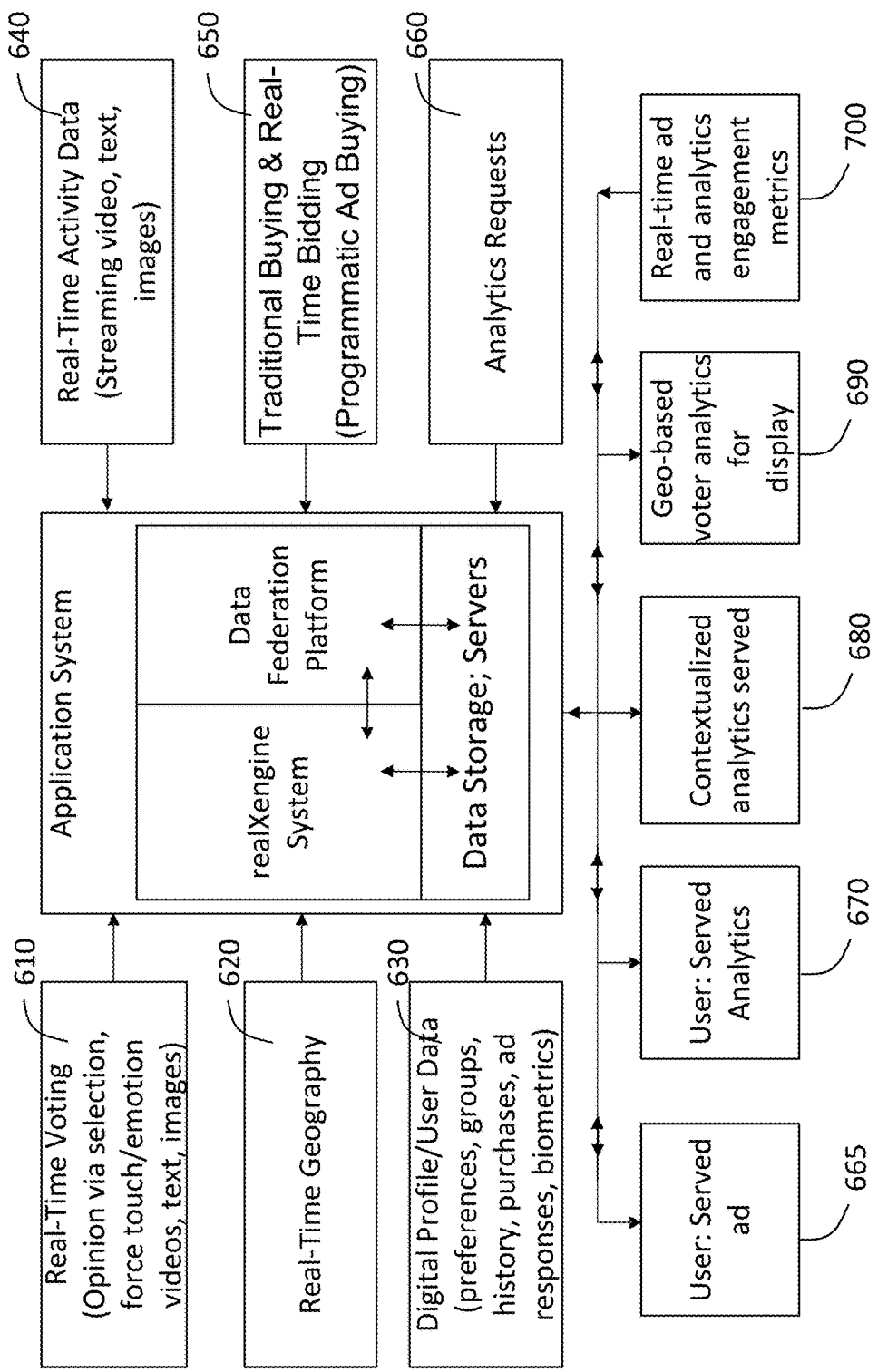
FIG. 2 is a functional block diagram illustrating the data flows to and from the application system according to an exemplary embodiment of the invention.

FIG. 2 illustrates the data flows to and from the application system according to an exemplary embodiment of the invention. As shown in block 610, the application system may receive real-time user data including comments, voting, or other information. The voting may include a selection, videos, text, images, or other information. In addition to user selections, users may provide a selection weighting, or other relevant selection characteristics.

The application system may be configured to receive other user data. For example, as shown in block 620, the application system may receive geographic user data such as country, region, state, school, restaurant, coordinates etc. It may also receive digital user live and profile information including preferences, current event, groups, history, purchases, historical ad responses, and biometric data as shown in block 630.

The application system may utilize user data to create real-time statistical data pertaining to the activity/events that may then be transmitted to users for consideration and discussion amongst users, as shown in block 670. This user-based, activity/event statistical data may also be provided to sports franchises, their sponsors, arenas, advertisers, media outlets, and other interested entities, as shown in block 700.

The statistical data may include a pre-defined menu of standard analytics. The application system may also receive and process requests for specific analytics, as shown in block 680. Requests for analytics may be received from users, advertisers, or other parties. The statistical data supplied by the application system may include general analytics, contextualized analytics, and geographically defined analytics, among other variations.

As shown in block 650, the application system may request and/or receive traditional buying and real-time bidding for advertisement space. These processes may be influenced by fan-based statistical analysis provided by the application system. These processes may also be influenced by other factors such as a particular event (e.g., Super bowl vs. regular season game), temporal characteristics (e.g., the fourth quarter of a close game vs. the fourth quarter of a blow-out), fan comments (e.g., number and content), call identification (e.g., creating a call instance when there was no referee call) and location, for example.

The application system may receive advertisements as shown in block 650, and may transmit those advertisements to users as shown in block 665. The advertisements may be user customized based on statistical analytics and/or individual response characteristics. The advertisements may be integrated into the user interface. This is the unique outcome that is a result of the unique method used in the URA System to combine analysis of users, context and statistical probability of marrying an advertisement or communication with a user in their real-time current emotional state.

In the foregoing examples, the information streams may be moderated or unmoderated. Moderated streams may be moderated by personalities relevant to the given event. For example, in a football game between the Denver Broncos and the Seattle Seahawks, one information stream or feed could be moderated by ex-Denver quarterback Peyton Manning. Information streams can also be moderated by sponsors or other entities. Block 640 may include questions, statements or comments published on which users can vote or share opinions. These data may be provided by automatedly-generated or humanly-fed sources.

Figure 3:
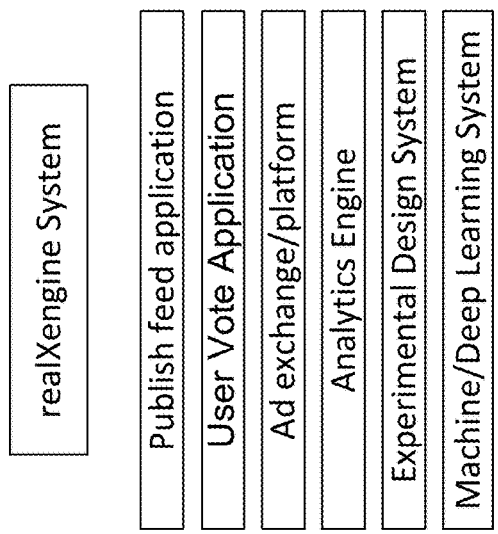
FIG. 3 is a diagram showing the design components of an application subsystem according to an exemplary embodiment of the invention.

FIG. 3 shows the design components of the application subsystem that controls the decision-making and logic combining publish feed and user-generated information, the ad exchange/platform application, the analytics engine, an experimental design system and the GUI (Graphical User Interface). The publish feed will gather all the listed feeds that are streamed to users throughout an event. This application facilitates user and automated real-time publication of statements, questions, or other texts inputs while also enabling image, and video for the purpose of seeking a response from other users. The user vote application is the core method of collecting and comparing and understanding user responses to those feeds. The ad exchange platform the method whereby the selection or identification of ads will be become part of the analysis involved in identifying potential combinations of communication or ad offerings to be delivered to the user. The analytics engine not only facilitates the analysis of combining this data together, but also the visualization of this information via user interface design in applications as well as browser based interfaces. In similar manner to other known experimental design systems (such as described in https://medium.com/netflix-techblog/its-all-a-bout-testing-the-netflix-experimentation-platform-4e1ca485c15) there will be testing of successful combinations of communications with users at different times and according to the inputs gathered via the publish feed. Methods for understanding users and the context of the real-time situation will be implemented and brought into this realXengine system by neural network analysis or deep learning. This logic will cross the application, system, platform and engines incorporated in this realXengine.

Figure 4:
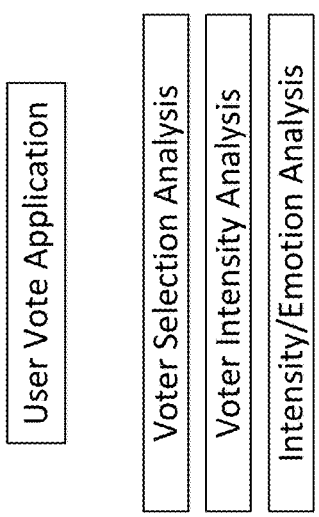
FIG. 4 shows an additional layer subsystem underneath the application subsystem according to an exemplary embodiment of the invention.

FIG. 4 shows an additional layer sub-system underneath the application sub-system. This system controls the assessment of when and where a user makes a response selection and analyzes it against what is happening in the geography, amongst group members, and historical information. Additionally, this subsystem assesses the intensity of the user's opinion in relation to a specific event at a specific time. This measure of input and intensity of input is what constitutes the interactive data collection mechanism of real-time user-based response and analytics. The uniqueness of this application comes in the combining user selection, which is in response to the published feed information, freely flowing to the user throughout an event. The analysis of timing and intensity, how the user votes (via inputs that are gestures, audible, or physical) is unique to what the user vote application can do to analyze the emotional state of the user. The emotional analysis in the user vote application uses inputs from the voting as well as other inputs in the realXengine to provide recommendations by to the realXengine to further analyze via the combined systems.

Figure 5:
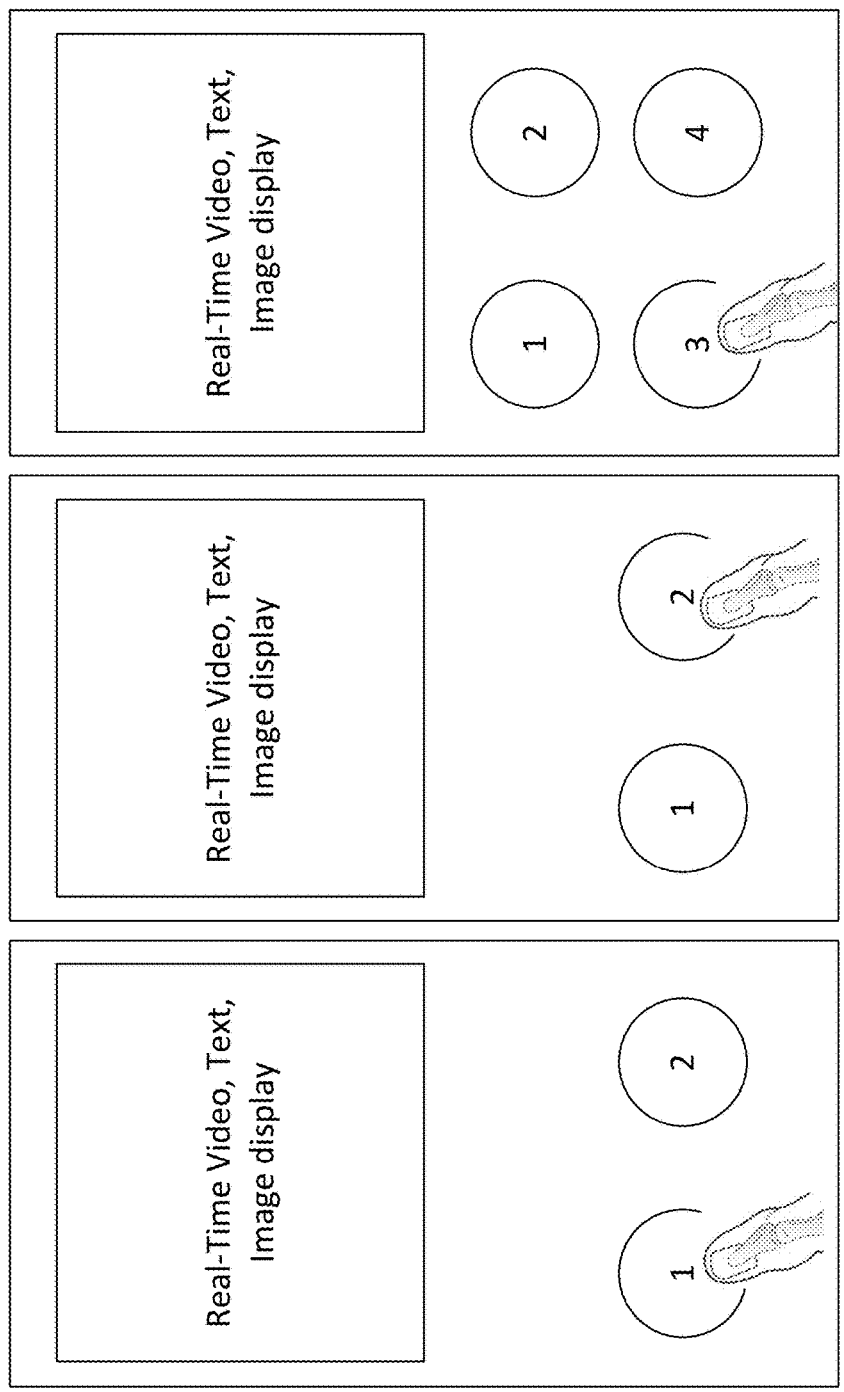
FIG. 5 is an illustration of a user interface for a system for creating real-time fan-based sports responses and analytics according to an exemplary embodiment of the invention.

FIG. 5 shows an example of a user interface for a system for creating real-time fan-based sports responses and analytics. The user interface may utilize an electronic device with a touch screen, for example. The user interface may also utilize a traditional mouse and keyboard interface, a watch, glasses/goggles or an internet-enabled TV and remote control device. Users see an event, either in attendance, via a broadcast or stream on a different device, or on the device where they engage with this software. At a specified instance or occurrence in the event, users are provided options and they can vote according to their opinion. Based on a given activity during the event such as in a sporting contest, such as an official decision pertaining to a foul or penalty, a user may be presented with a choice to vote on whether that user agrees with the official's ruling. Other options may include but are not limited to multiple selection or other types of user voting mechanisms.

The issue on which users may be asked to vote may be presented on an electronic device via text, audio, video, or other form of communication. The voting options may be presented as virtual buttons or in any other way, associated with particular stated responses. For example, button 1 in FIG. 5 may correspond to "Yes," while button 2 may correspond to "No." More than two voting selections may be utilized depending on the requirements for a given question, statement or instance. The user may vote by choosing a virtual button corresponding to the user's desired choice, and pressing that virtual button. Additionally, options may be presented for the user to audibly capture a response and in this way choose the desired virtual button. Advertisements may be pushed to users through this interface, those advertisements may be real-time targeted advertisements based on a user's vote, voting history, locations, comments, etc.

Figure 6:
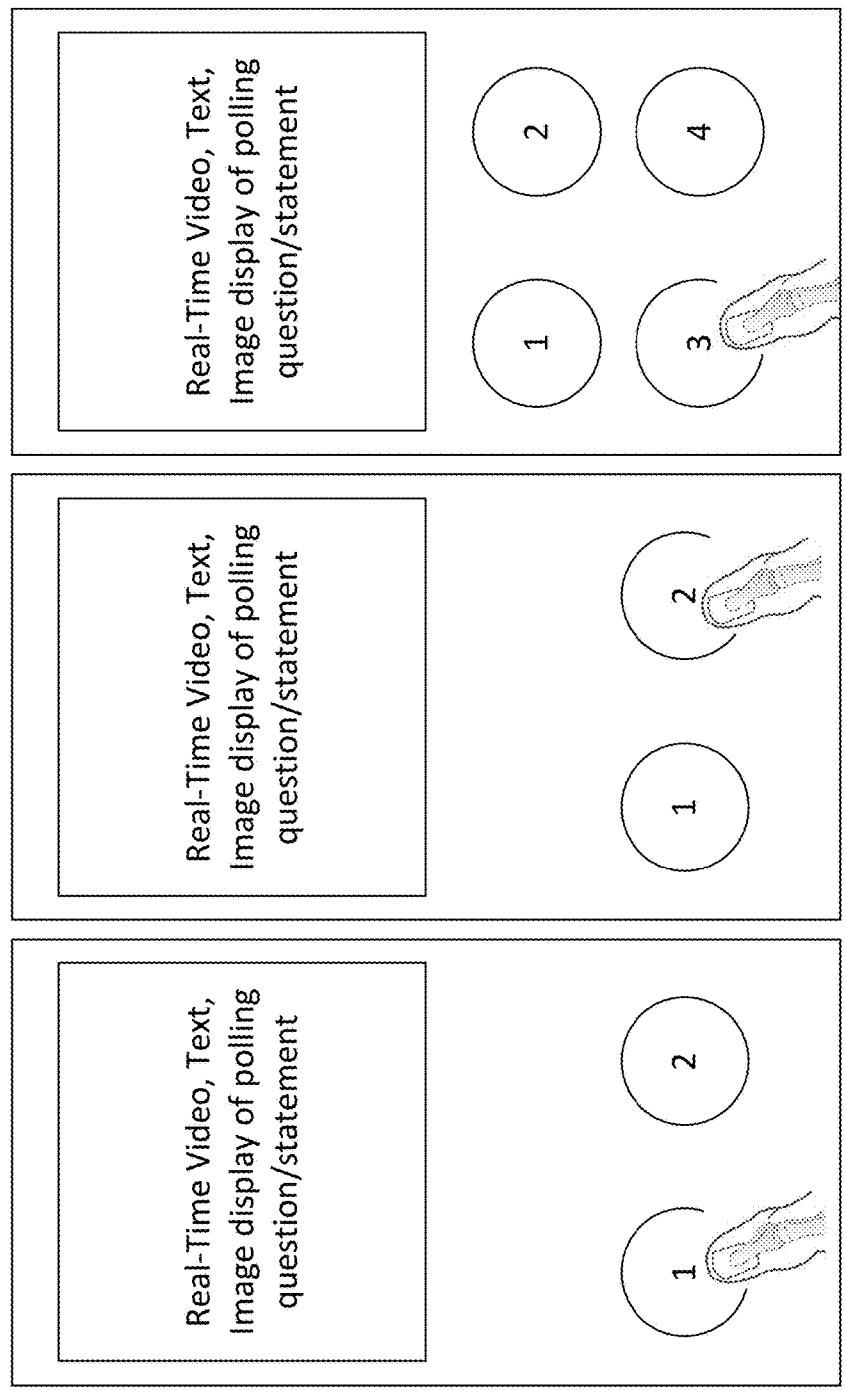
FIG. 6 illustrates a user interface for a system for creating real-time, fan-based sports responses and analytics according to an exemplary embodiment of the invention.

FIG. 6 discloses a user interface for a system for creating real-time, fan-based sports responses and analytics according to one embodiment of the invention. As users are accustomed to using the application as a polling device, polls can be presented to users to capture their opinions on other things, such as products, services, brands, or other matters. In FIG. 6, a user may be presented with a polling question or statement. The system may utilize this additional information in one or more ways, such as in statistical analysis, in targeting advertisements to the user, in facilitating discussion amongst users, etc. To facilitate ongoing real-time discussion amongst users, the system may allow a user to post a comment to one or more defined groups of users. Advertisements may be pushed to users through this interface, and those advertisements may be real-time, targeted advertisements based on a user's response to a polling question or statement, vote, voting history, locations, groups or other comments.

Figure 7:
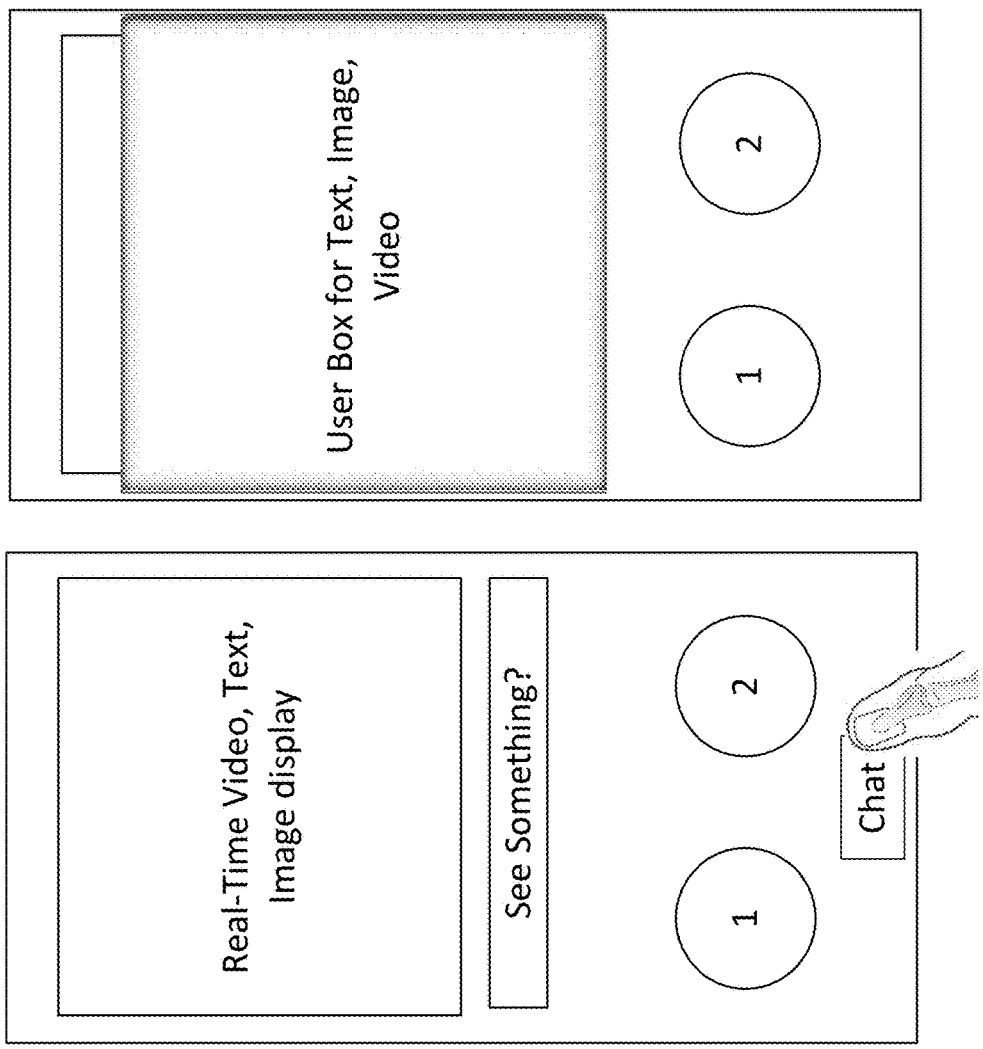
FIG. 7 illustrates an example of a user interface that can be used by a sports fan to socialize and give feedback according to an exemplary embodiment of the invention.

FIG. 7 illustrates an example of a user interface that can be used by a sports fan to socialize and give feedback. Before or following a vote, users can select to share with others why they voted for a specific option, what they think about the event or any other topic. As shown in FIG. 7, a separate screen appears to type text, upload video/image, or take a video/image. This screen is associated to a particular group and/or event. Additionally, there is provided a user to press a button if they saw something interesting, unique, surprising, something with which they disagree. This button labeled "See Something" is logged when clicked. It is then compared in real time and in time of the event to other users pressing the button. Analysis across many data points of users will recognize when a large group of users push this button. This spike in use tags the system to analyze, within the short period of time when an increased number of people pushed the button, to then analyze via deep learning, machine learning, algorithms or other statistical methods, all the user inputs and publisher inputs. This analysis generates a result based on topical assessment, the topic on which was most likely the cause of interest in the population pushing the "See Something" button. In one embodiment, this is exemplified when users watching a football game see an incident where an infraction occurred, yet the referee made no call. Many users identify this as a missed call and push the "See Something" button. The URA system then analyzes what occurred in the game by assessing the game statistics, situation and progress as well as the publisher comments, statements and questions, in addition to user comments within that time period and soon after. This analysis facilitates a statement to be auto-generated upon with users can vote, for example, #45 Smith fouled #32.

Figure 8:
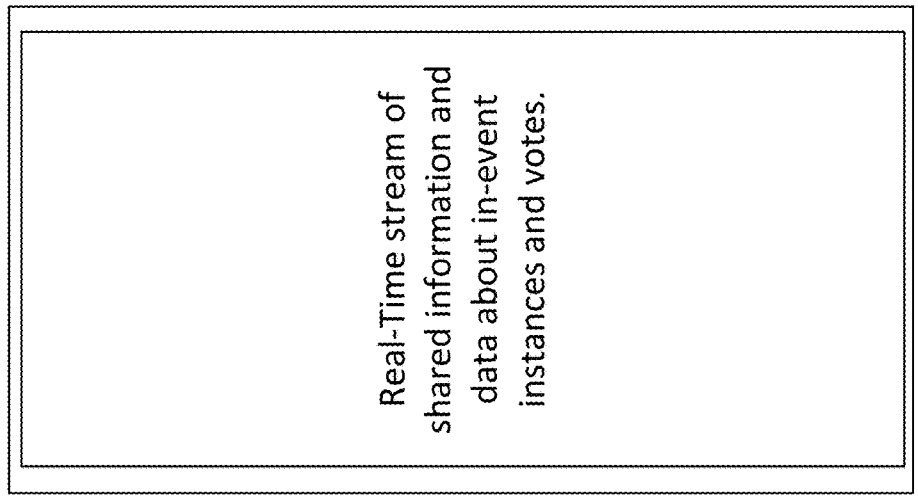
FIG. 8 illustrates an example of a user interface for displaying group-based information according to an exemplary embodiment of the invention.

FIG. 8 illustrates an example of a user interface for displaying group-based information. Groups can be facilitated by displayed streams of information about the group statistics, user inputs, etc. The information stream may be restricted by one or more defining characteristic such as geographic location (e.g., state, restaurant, etc.), preferred team, event/show/activity being viewed or other defining characteristic(s) of a group. The information stream may include information related to a particular sporting event such as score information, play-by-play information, user comments and discussion, voting results, statistical analysis, etc. Advertisements may be pushed to users through this interface, and those advertisements may be real-time, targeted advertisements based on a user's group, vote, voting history, locations, or comments.

Figure 9:
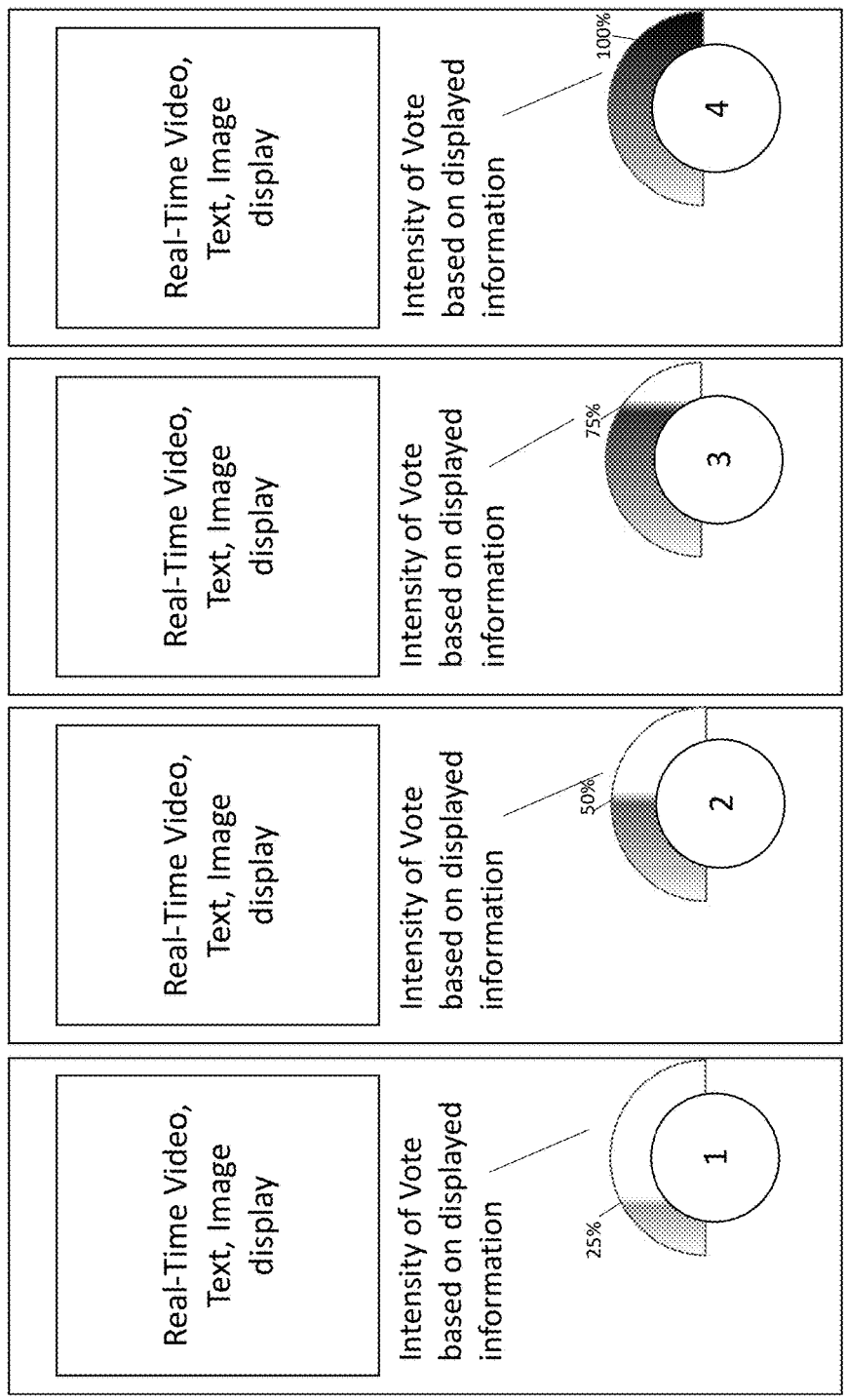
FIG. 9 illustrates a user interface for a system for creating real-time, fan-based sports responses and analytics according to an exemplary embodiment of the invention.

FIG. 9 discloses a user interface for a system for creating real-time, fan-based sports responses and analytics according to one embodiment of the invention. In FIG. 9, a user may push a virtual button corresponding with a desired voting response. They press their selection with a pressure equal to their agreement/opinion strength. The expression of selection intensity may also be measured in amount of time a user holds down a button. Depending on user hardware capabilities, the application will measure the input intensity. The harder or longer they press, the more they express their passion or surety about their opinion. The lighter or quicker, the less so. Additional information may be obtained in the form of a response weight based on how hard the user presses the button. For example, if a user lightly touches a virtual button, a user response with a "somewhat agree/disagree" weighting may be recorded, but if a user firmly presses or holds the button, a response with a "strongly agree/disagree" weighting may be recorded. Gradations between the two extremes may also be interpreted and recorded. The application system may use these vote weightings in statistical analysis, as information provided to advertisers to help facilitate targeted advertising, etc. The foregoing functionality may be achieved using known technologies, such as those disclosed in U.S. Patent Publication No. 2016/0054826, for example.

Figure 10:
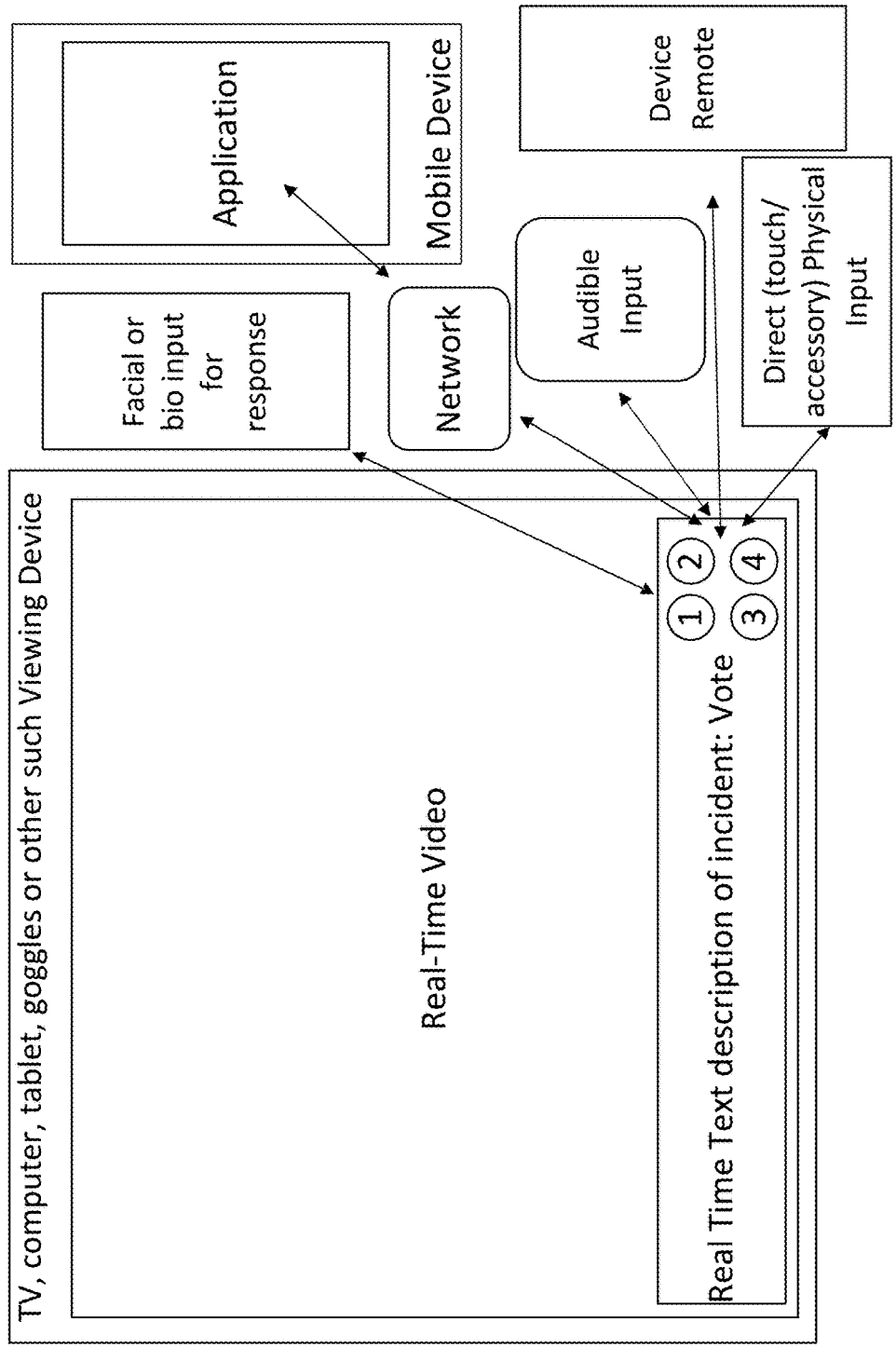
FIG. 10 is a diagram of a system for on-screen, real-time streaming voting according to an exemplary embodiment of the invention.

FIG. 10 is a diagram of a system for on-screen, real-time streaming voting according to an exemplary embodiment of the invention. The URA System, in connection with its digital streaming of an event such as a live sporting event, can integrate the use of software that delivers the real-time play by play or publisher comments, allowing for user voting/interaction via the device remote or via a sister application on another device. This interaction with the user is driven through the viewing screen but enabled on a mobile device, the device remote control, or directly with the display device, via touch, facial recognition or audibly. As shown in FIG. 10, on the bottom of the screen, immediately after a play, a text box appears with the text description of the play. Additionally, options are displayed for vote.

Figure 11:
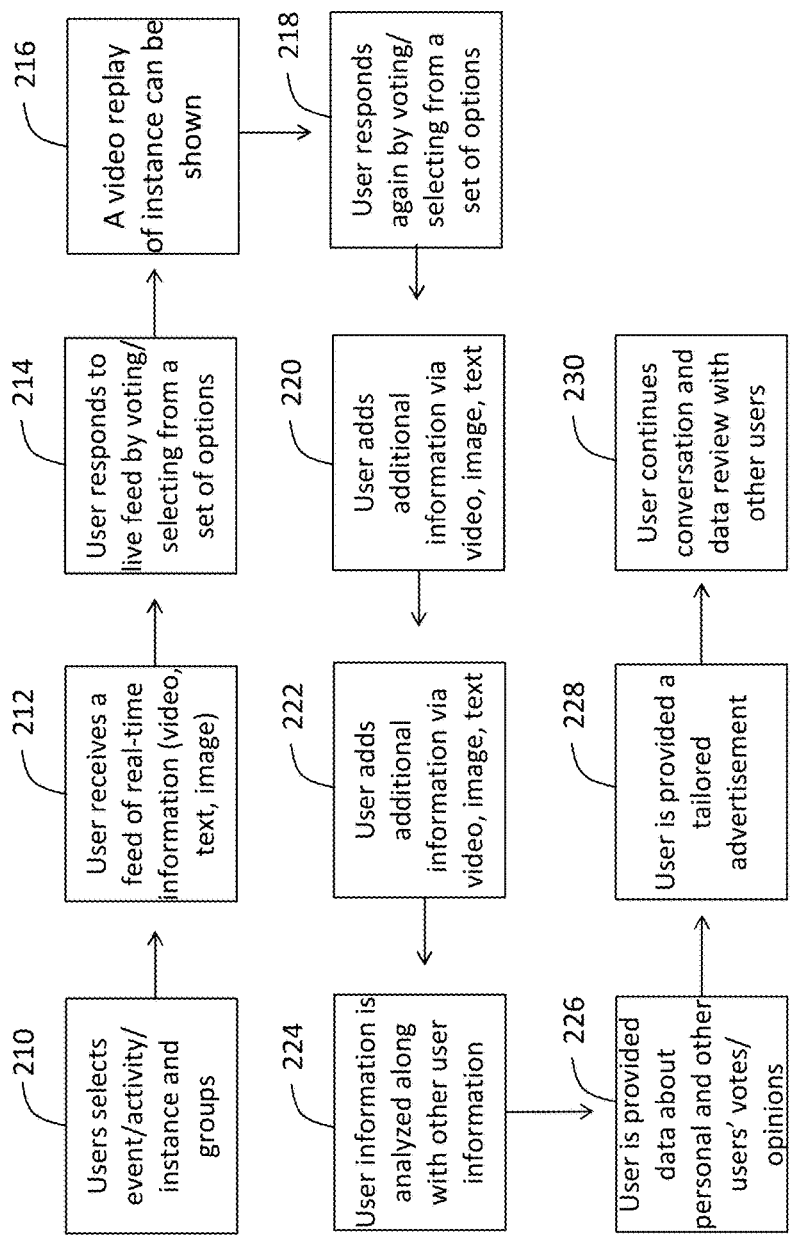
FIG. 11 is a flow chart illustrating an example of the user interaction according to an exemplary embodiment of the invention.

FIG. 11 is a flow chart illustrating an example of the user interaction according to an exemplary embodiment of the invention. As shown in FIG. 11, the user interaction is based on the integration of user votes, the intensity of user votes, and the sharing of additional data and multiple votes before and after replay of a live-event instance. The user can interact in social groups and see the data of different groups and group individuals In step 210, the user selects event/activity/instance and groups. This identifies which event the user will receive live stream data. It allows creation of a group in which members can be added and removed, who can participate in a conversation before, during and after that one event or a number of events. The user is able to switch between multiple groups at one time (e.g. the user may select an event and create or join a group of which family makes up the membership, a different group where co-workers or friends make up the membership, a third group that is based on the user's geography (perhaps the user is live at the event), and a fourth group that is an official conversation managed by the event or team). At any time, the user may have multiple events live in the application. The application allows the user to switch between events to execute any number of activities in the application workflows. The following steps include what may happen in one event with one group, but is not limited in number, time or duration in how the user interacts with events and groups.

In step 212, the user receives a live feed of real-time information (video, audio, text, image). This can occur via a number of different types of connected devices. In step 214, the user responds to live feed by voting/selecting from a set of options. For a set period of time, users may respond. A user can express his or her opinion about the live feed through the designated response buttons (e.g. selecting agreement or disagreement to a referee call in a sporting event), or creating for himself/herself an event instance or response that is unrequested based on the user's opinion of the event (e.g. while watching a sporting event a referee does not call a foul during an instance where the user thought there should have been a foul called.).

In step 216, a video replay of instance is shown. This step is optional in the process, simply allowing users to view the play once more. In step 218, the user responds again by voting/selecting from a set of options. For a set period of time users may respond. In step 220, the user expresses an intensity of his or her opinion via force upon selecting an option. This intensity is expressed through force touch onto the device virtual button or by the length of time the virtual button is selected.

In step 222, the user adds additional information via video, image, or text. Supporting the opinion of the user, the user may upload to their group conversations opinions or expressions via a number of varied types of media. In step 224, the user information is analyzed along with other user information. User inputs enter the application system and are analyzed against a number of variables. In step 226, the user is provided data about personal and other users votes/opinions. Users may be provided immediate data about their response and their group and group member's responses to the event/activity.

In step 228, the user is provided a tailored advertisement. On a variety of screens, advertising communications may be served to the user. In step 230, the user continues conversation and data review with other users. The user may request additional data regarding their personal, group, or group individual's selection. The user may continue discussing the event inside group conversation and using provided data for discussion.

Figure 12:
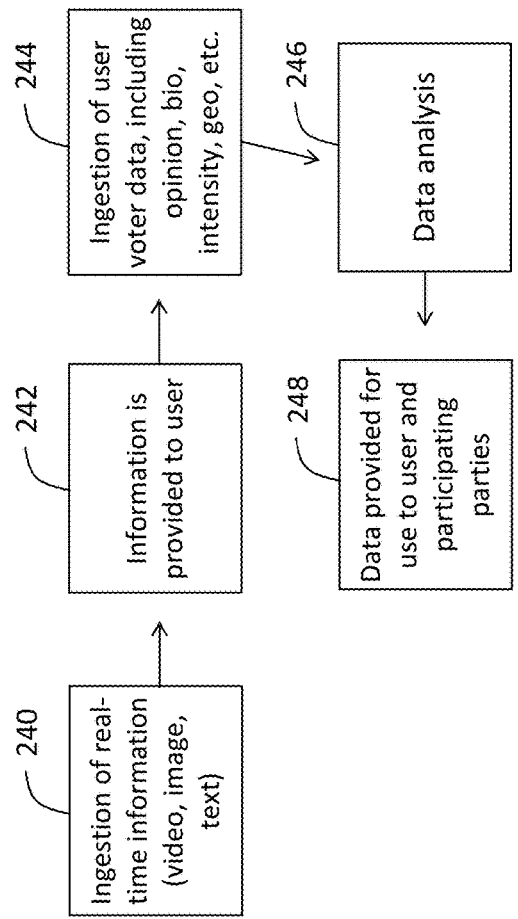
FIG. 12 illustrates a process of data input from the user and how it is combined with other information according to an exemplary embodiment of the invention.

FIG. 12 shows from a high level and from the viewpoint of the system, the process of data input from the user and how it is combined with other information and provided back to users and others. Step 240 involves the ingestion of real-time information (video, audio image, text). The application system receives different types of data from a number of different sources. This includes real-time event data and real-time user data based on current or previous event activities. It also includes publisher information, comments or questions.

In step 242, information is provided to the user. Real-time event data is provided to the user. Step 244 involves the ingestion of user voter data, including opinion, intensity, geography, etc. The user expresses input via a vote/selection as well as expresses opinion via other types of media information (video, audio, image, text). In step 246, data analysis occurs inside the application system, using all inputs into the system. In step 248, data is provided for use to user and participating parties. This data can be manipulated, combined and rearranged to fit the need of the user. There may be data access limits to certain users and participating parties based on levels of approval. This approval may be based on a number of reasons, one possibly being subscription and/or payment.

Figure 13:
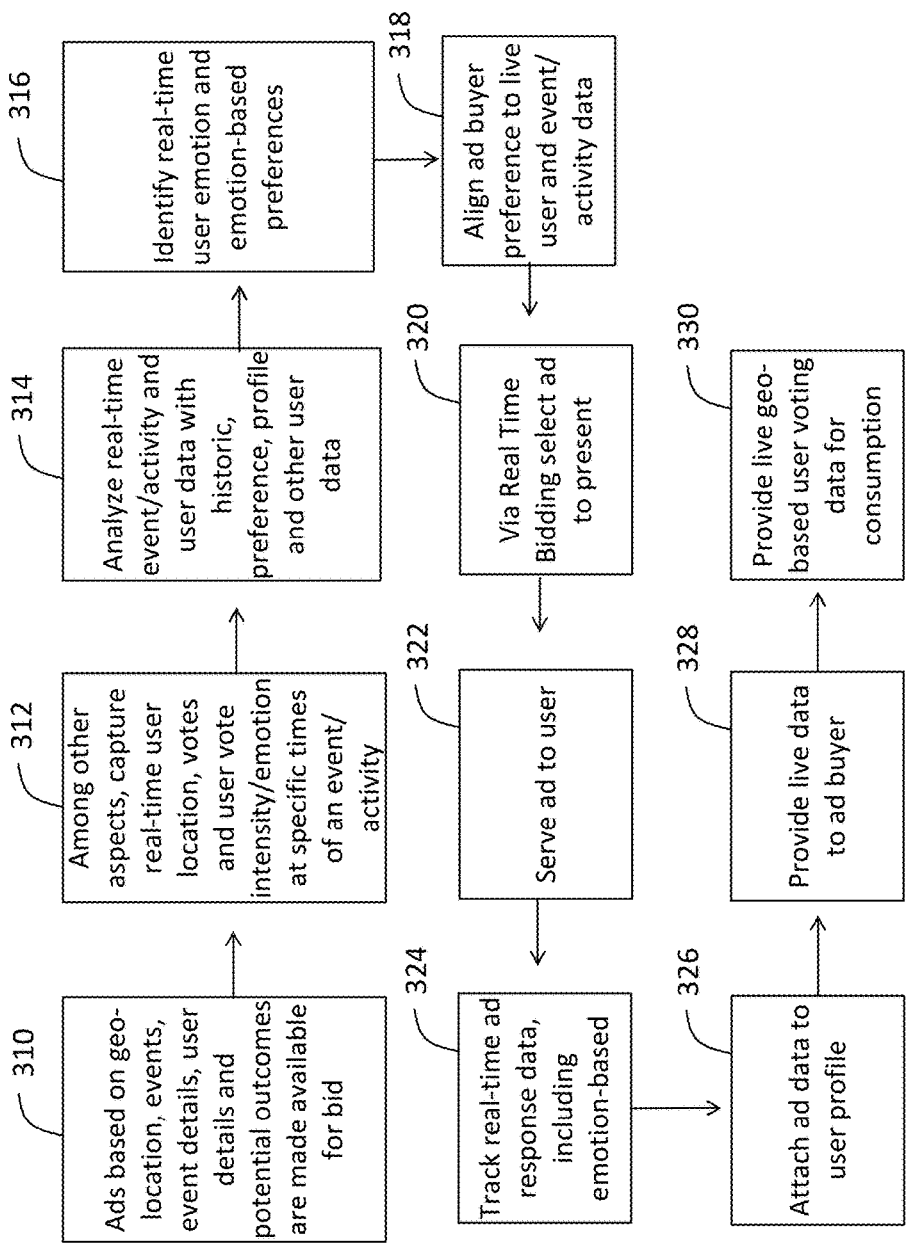
FIG. 13 is a flow chart illustrating the addition of a real-time-bidding (programmatic ad buying) advertising platform according to an exemplary embodiment of the invention.

FIG. 13 addresses the addition of a real-time-bidding (programmatic ad buying) advertising platform into the real-time event and real-time user response and location portions of the application. This is from the viewpoint of the advertiser and the application. One of the advantageous features of this workflow is the ability to identify user emotions in real time. Another significant aspect is combining the emotions with the geo-locations data as well as the user history, preferences, profile, etc. Connected to this is the ability to link ad buyer preferences with both the profile makeup as well as the real-time emotional state of a user, historical actions, participating groups, group members, etc. There is currently no technology that facilitates a matrix for targeted ads that join user historical/preference, real-time user location, and real-time emotional state of the user in this manner. In addition, this information can be used to address a group dynamic within a physical location.

In step 310, ads based on geo-location, events, event details, user details and potential outcomes are made available for bid. Potential outcomes are situational outcomes that may or may not present themselves during a specific event or events (e.g. during the third quarter of a football game when the team's scores are within six points of each other, users in a specific geography who have specified preferences or have taken specific actions historically select to agree or disagree on a call made by the referee). Advertisers are provided the opportunity to select situations or types of profiles to which it would like to advertise situationally. As the event progresses, different scenarios play out, meeting or not meeting the advertiser's requested scenarios. In step 312, among other aspects, the system captures real-time user location, votes and user vote intensity at specific times of an event/activity.

In step 314, the system analyzes real-time event/activity and user data with historic, preference, profile and other user data. In step 316, the system identifies real-time user emotion and emotion-based preferences based on gathered data. From the user and situational data provided, the emotional state of the user will be understood. In step 318, the system can align ad buyer preference to live user and event/activity data. In step 320, the system can select an ad to present via real time bidding. At that time of a real-time in-event scenario, when two or more advertisers have (ahead of time) selected the same scenario types, the price to which the advertiser has agreed to pay for the opportunity to advertise to that type of user in that type of scenario will be compared to the price other advertisers have set as their limit to advertise to that select user in such a scenario.

In step 322, the system can serve an ad to the user. The advertisement of the highest paying advertiser for that scenario will be presented to the user at the previously agreed upon value. In step 324, the system can track real-time ad response data, including emotion-based and situational based information. In step 326, the system can attach ad data to the user profile. In step 328, the system can provide live data to participating parties. This data can be accessed at different levels by different users and participating parties. In step 330, the system can provide live geo-based user voting data for consumption. This information may be valuable for use by the user and others as there is opportunity for the user to connect with other users based on the location when the ad is served. This social-geo-based ad participation scenario is addressed in FIG. 14.

Figure 14:
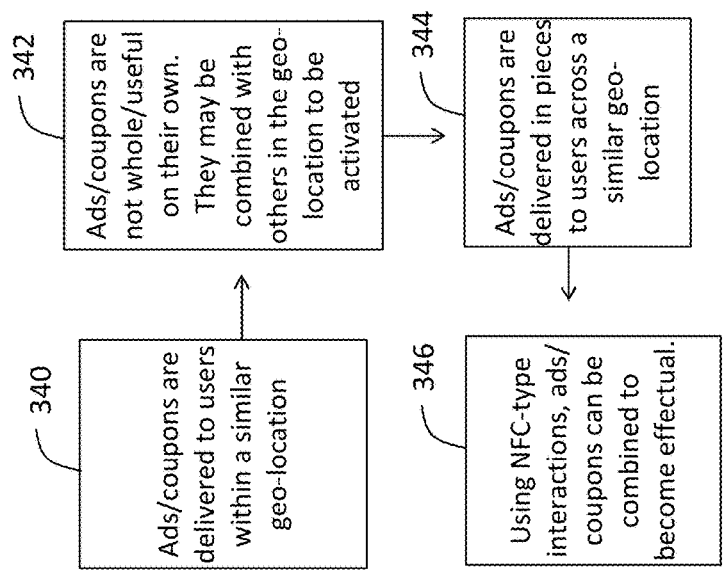
FIG. 14 is a flow chart illustrating a defined group-based ad participation scenario according to an exemplary embodiment of the invention.

The process shown in FIG. 14 encourages physical social interaction within a specific location according to an exemplary embodiment of the invention. This integrates an ad/coupon—or the brand of a company—into the conversation, actions and social, in-person engagement via a social application. Ads/coupons can become useful after joining with connected pieces of the ads that are served to other users in a geo-boundary. In step 340, ads/coupons are delivered to users within a similar geo-location. This is an output of the URA and its system and subsystem analysis. These ads are uniquely identified, and in this exemplary embodiment are disbursed based on location. There are other unique contextual data that will define combinations of ad delivery in other embodiments. These may include, but are not limited to recent votes to feeds published, preferences of a user or a combination of many of such data. In step 342, ads/coupons may not be whole/useful on their own. They may need to be combined with others in the geo-location to be activated. This social driven interaction is a new concept of real-time group-purchasing where the value of the delivered coupon is delivered uniquely so that the redemption of the coupon can be had by a digital combining of the ads/coupons sent to various users. In step 344, ads/coupons may be delivered in pieces to users across a similar geo-location. In step 346, using NFC-type interactions, ads/coupons can be combined to become effectual.

Figure 16:
FIG. 16 illustrates a screen shot providing the ability to navigate to and select plays that have occurred and see the opinion of the user according to an exemplary embodiment of the invention.
Figure 15:
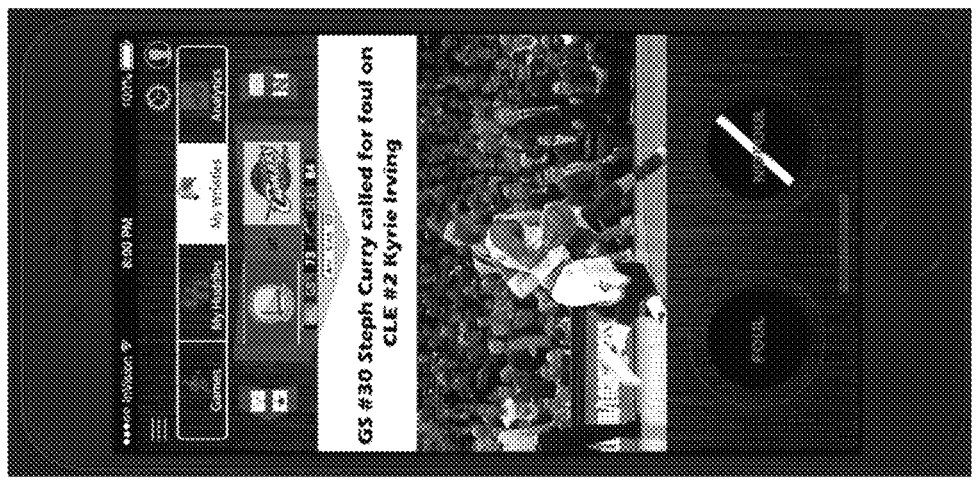
FIG. 15 illustrates a screen shot of real-time data transmitted to the user's screen according to an exemplary embodiment of the invention.
Figure 17:
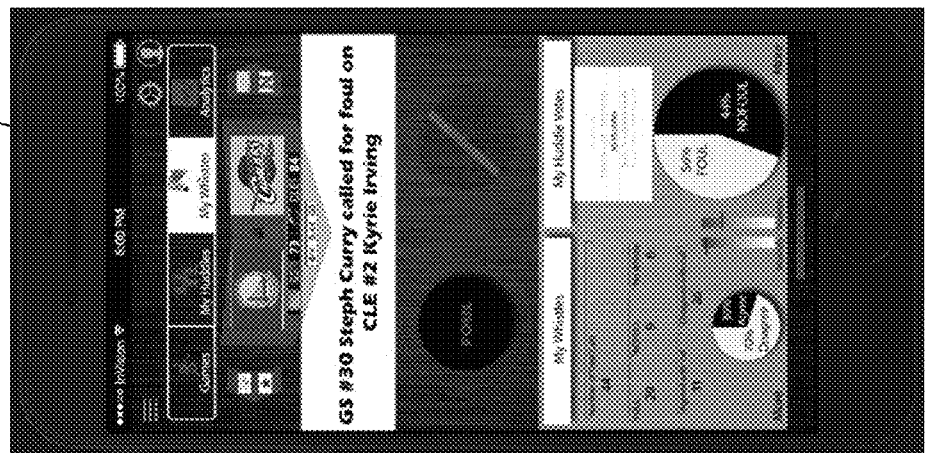
FIG. 17 illustrates an example of a screen that is shown after a user makes an opinion call according to an exemplary embodiment of the invention.

FIGS. 15-17 illustrate examples of screen shots of the mobile app according to an exemplary embodiment of the invention. In each figure, the user may switch between games or social groups with whom the user is watching the game. Social discussions via chat can occur, easily accessed from any screen via different methods, for example, shown in the figures by the lines at the bottom of the screen providing the ability to lift the screen to chat with groups. FIG. 15 shows real-time data coming to the user's screen. This may include all or any types of media including text, image or video. FIG. 16 shows the ability to navigate to and select plays that have occurred and quickly see the opinion of the user on that referee call. The navigation can occur by play name, image or by time of the game, for example. FIG. 17 shows an example of a screen that is shown after a user makes an opinion call about a referee whistle. This shows data about the user's opinions during the game as well as the data about the groups for which the user is a part during that game. It also includes analytics that combine this information.

Other advantages that various embodiments of the invention can provide include a relatively long session length for the app. Live sporting events can last for hours. If used throughout the game, the URA System app typically will be open a significant amount of time. Assuming there will be those who begin a session and don't watch an entire game, the average session length may be 45 minutes, which is a relatively long period of time for mobile applications. In addition, exemplary embodiment of the invention may provide greater retention of the app. This may be due to the dual social aspect and the frequency of live events that are occurrences which drive repeated usage. Similarly, according to another embodiment of the invention, fans of a TV show will return to watch a recorded show for a season and be linked socially to groups watching that show simultaneously.

The URA System can be designed to enable sponsorship offerings according to an exemplary embodiment of the invention. The URA System may become a sponsorship space for a choice company to build their connection with the team and connect with fans as they are emotionally engaging with a team. The URA System can be a sponsorship option for placement that transcends the location of the arena and the time of the game. While during a game it is a frequently impressionable space where fans can emotionally connect with a sponsor. Example options range from an app wrapped in the team/sponsor joint logos or providing a sponsored contributor who mingles digitally on the platform with the "team group" in arena or openly.

For advertisers who seek to speak precisely to a targeted audience, the URA System can offer a unique social media platform where advertising messages are communicated to the right individual at the right time. Advertisers may seek precise ad targeting. The URA System can offer precision based on a number of factors such as preferences, real-time sentiment and real-time location. Advertisers have the opportunity to capitalize on the emotions of fans in the moment. Ads can be served up based on events and activities. Advertisements can be purchased in a combined situational-based and geo-based circumstances.

For media outlets who seek to exude expertise, the URA System can provide quick and precise data about viewer reactions to live sporting events. Media outlets have up-to-the-second player and team statistics. They have expert commentators who share their opinions. In addition to the expertise, the URA System allows them to bring to the live broadcast qualitative, quantitative, and sentiment data. The URA System not only can provide this data, it can do so in real time. Response data can be provided from fans who are expressing their opinions in a number of useful ways for the media—as a quantifiable URA System response to a play call, the measurement of how intensely they feel about that decision, or as typed text that they push to other social channels.

For location-based establishments, including arenas and restaurants that seek to provide guests with a memorable experience, the URA System can provide real-time, geo-located game-response data derived from in-establishment guests. For example, a restaurant/bar can use URA System as a tool for in-house entertainment. The restaurant/bar purchases data for use inside all their locations. Screens are showing the game. But there are other screens where they are showing live, updated geo-based data using the inputs of the current, in-restaurant patrons. The screens increase the atmosphere of unity and enjoyment.

The URA System can be used to link location, timing and social as a unique package. For example, a ticket company could partner to take advantage of people already in the arena (location) who may want to move up closer. Others may be leaving early or couldn't make the game and want to sell their seats for the second half at a deeply-discounted price during the game (timing). Because the app is open for "micro-moment" use, people can engage in an instantaneous marketplace (social) for the ticket.

Gamification, points and other methods of trigger, action, reward methods of in-app engagement will be included to take advantage of user activities.

The URA System can be designed to offer in-arena services according to an exemplary embodiment of the invention. Food and merchandise can be ordered in-app. The most difficult part of building the use of such an app in-arena is the broader use case for having the app. When the URA System is already open, ordering two dogs, a Coke and a hat becomes that much easier.

The URA System can include an ad platform built to serve programmatic placement based on options not currently available, as it will have the capability of not only matching demographics and history, but also aligning geography with real-time user mood, based on user votes, team preferences and current game statistics. This platform will serve ads uniquely, engaging as a communication and persuasion tool. Because of user preferences, it will have the capability to serve ads messaged for situations that combine the aspects of the current situation mixed with historical data. In-app ads can be served to fans based solely on location, preferences, past actions, score, time, game time and fan emotion. For example, an advertiser can run an ad that is tied to the segment and use history but with no other specific variables. The URA System can also enable in-app, real time ads (including for teams and arenas). Ads can be served to fans based on a combination of location, preferences, past actions, score, time, game time and fan emotion. These types allow for advertisers to reach even more specific audiences at specific times.

According to other embodiments, the URA System can be used to elicit other types of opinions from its users. Life is full of situations for which people have strong opinions. The app can be adapted for use in other, everyday settings—vote on your life situations.

Figure 18:
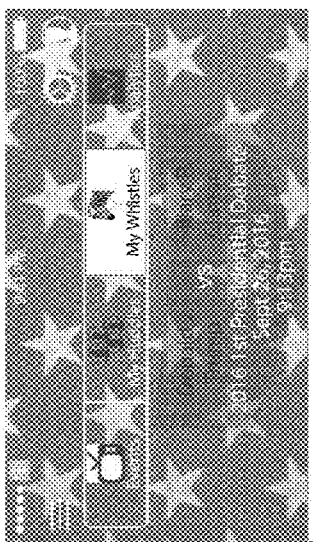
FIG. 18 illustrates an example of a user interface for a political debate according to an exemplary embodiment of the invention.
Figure 18:
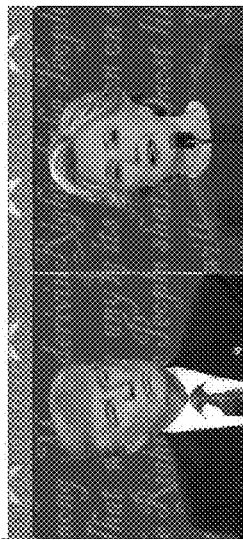
Figure 18:
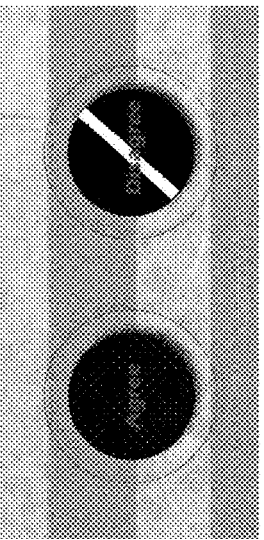

According to another embodiment of the invention, the URA System can be used in connection with presidential debates and polling. Among other live events, traditionally highly viewed live events include presidential debates. This application can be built to manage real-time user feedback as prompted through live data from the event—in this case, a debate. As shown in FIG. 18, such an instance can provide real-time quotes from the candidates to the audience users to share their opinion in agreement or disagreement with the candidate's statement. Additionally, the users will have the opportunity, just as in other embodiments, to engage m social conversations with friends, view personal statistics of opinions and view statistics of their group members as well. This data will also be available for comparative analytics among many types of users across all groups. Asking questions before or after the event, and even ongoing up to and through not only the debates, but the election and exit polling are a continuation of the same user engagement.

Figure 19:
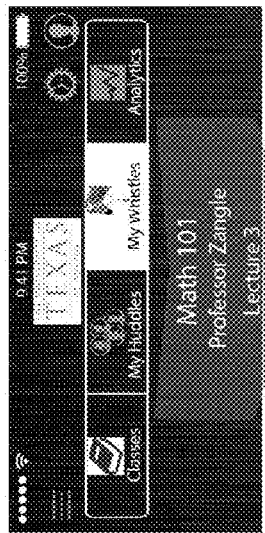
FIG. 19 illustrates an example of the application used in a classroom or lecture setting according to an exemplary embodiment of the invention.
Figure 19:
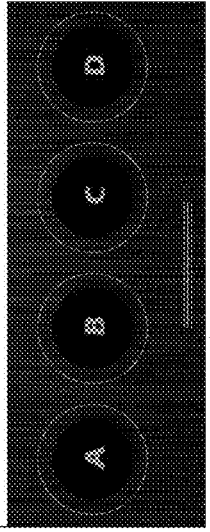

According to another embodiment of the invention, the URA System can be used in a classroom or in a virtual classroom, either planned or on demand. FIG. 19 depicts an example of the application used in a classroom or lecture setting. Whether this is in a physical location or remote, the same principles can apply. The event may be established ahead of time or it may be added and set up on demand, as may the group of people who are participating.

This allows the instructor, student presenting, or lecturer in general, to poll the audience, no matter what mechanism the audience is using to access the lecture. Such a tool that transcends the setting and the channel through which the questions and answers are requested and submitted facilitates a true global potential for engagement.

Figure 20:
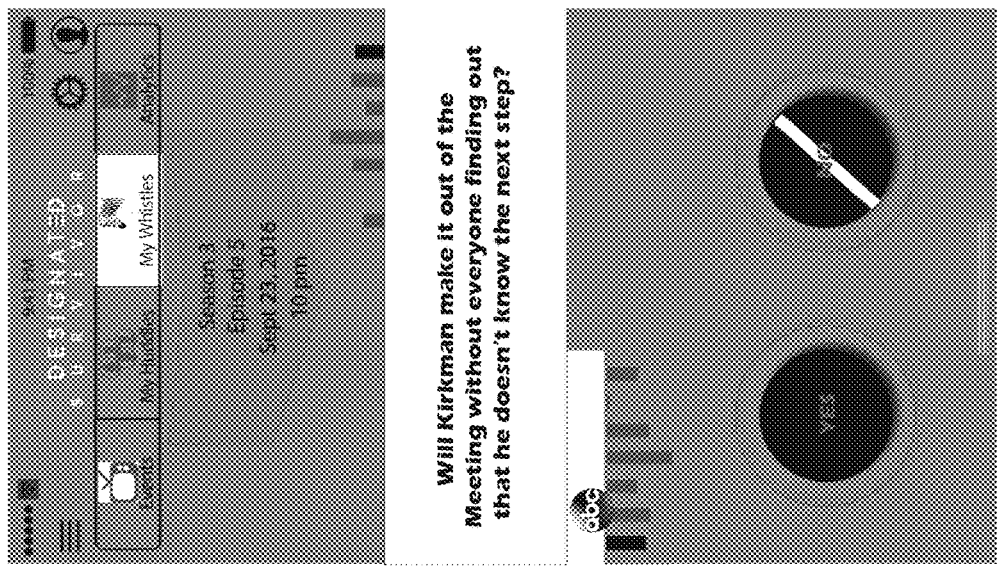
FIG. 20 illustrates an example of a user interface used in connection with live or recorded television, movies, shows and/or ads according to an exemplary embodiment of the invention.

According to another embodiment of the invention, the URA System can be used in connection with live or recorded television, movies, shows and ads. An example of a screen shot is shown in FIG. 20. Specific questions regarding the plot, characters, situations, performers, actors, etc. can be assessed in real time. This may include dramatic, pre-filmed shows (as seen in FIG. 20) as well as live events. Users can not only share their opinion of what is unfolding but they can see and share statistics with their friends about who had the same opinion or not and discuss reasons why.

Figure 21:
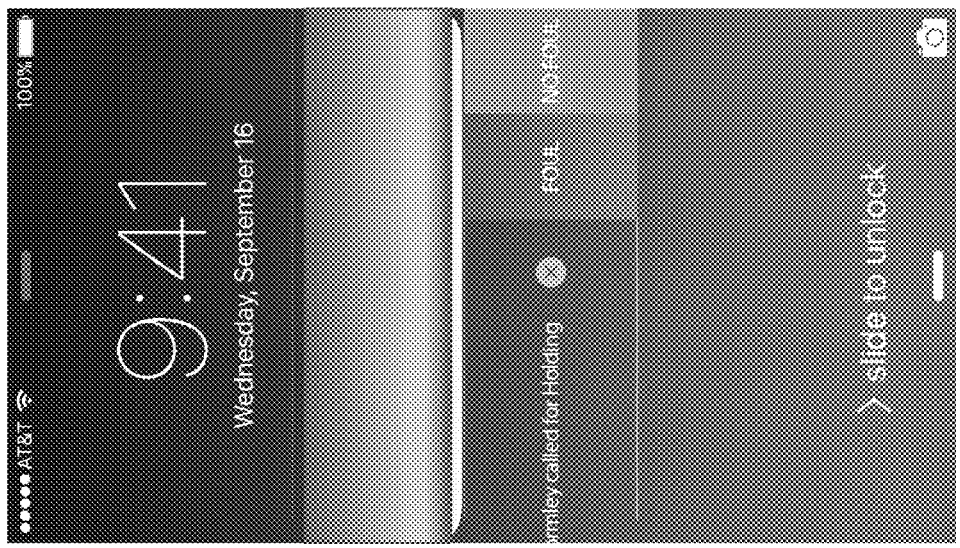
FIG. 21 illustrates a screen shot of real-time data transmitted to the user's screen according to an exemplary embodiment of the invention.
Figure 22:
FIG. 22 illustrates a screen shot of real-time data transmitted to the user's screen according to an exemplary embodiment of the invention.

FIG. 21 illustrates another example of a user interface in which a voting button is presented on a lock screen of the user's mobile phone. This configuration allows the user to immediately vote without having to even enter a pass code to unlock the phone. FIG. 22 illustrates another embodiment in which the user's personal computing device is a smart watch. The smart watch in FIG. 22 is a form factor that shows an example method of collecting bio data—via the watch—and potentially other wearables. The biological data can then be used as additional data in analyzing the user's real-time responses during an event. In general the interface can be presented on any type of personal computing device of the user, such as a smart watch, smart phone, smart TV, tablet computer, or laptop computer, for example.

It should be recognized that although several embodiments have been disclosed, these embodiments are not exclusive and aspects of one embodiment may be applicable to other embodiments (e.g. eSports).

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

Data and information maintained by the computers and servers shown in FIGS. 1 and 2 may be stored and cataloged in one or more databases, which may comprise or interface with a searchable database and/or a cloud database. The databases may comprise, include or interface to a relational database. Other databases, such as a query format database, a Standard Query Language (SQL) format database, a storage area network (SAN), or another similar data storage device, query format, platform or resource may be used. The databases may comprise a single database or a collection of databases. In some embodiments, the databases may comprise a file management system, program or application for storing and maintaining data and information used or generated by the various features and functions of the systems and methods described herein.

The communications networks used with the system may be comprised of, or may interface to any one or more of the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network, for example.

The communications networks used with the system may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. The communications networks may further comprise, include or interface to any one or more of an RS-232 serial connection, an IEEE-1394 (Firewire) connection, a Fiber Channel connection, an infrared (IrDA) port, a Small Computer Systems Interface (SCSI) connection, a Universal Serial Bus (USB) connection or another wired or wireless, digital or analog interface or connection.

In some embodiments, the communication networks may comprise a satellite communications network, such as a direct broadcast communication system (DBS) having the requisite number of dishes, satellites and transmitter/receiver boxes, for example. The communications network may also comprise a telephone communications network, such as the Public Switched Telephone Network (PSTN). In another embodiment, communication network 110 may comprise a Personal Branch Exchange (PBX), which may further connect to the PSTN.

Although examples of servers, computers, and personal computing devices are shown in the figures, exemplary embodiments of the invention may utilize other types of communication devices whereby a user may interact with a network that transmits and delivers data and information used by the various systems and methods described herein. The personal computing devices may include desktop computers, laptop computers, tablet computers, smart phones, and other mobile computing devices, for example. The servers, databases, and personal computing devices may include a microprocessor, a microcontroller or other device operating under programmed control. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art. The mobile devices and personal computing devices may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The mobile devices and personal computing devices may also include a network-enabled appliance or another TCP/IP client or other device. The personal computing devices may include various connections such as a cell phone connection, WiFi connection, Bluetooth connection, satellite network connection, and/or near field communication (NFC) connection, for example.

As described above, the figures show a number of servers, databases, and personal computing devices, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software, firmware, hardware, or a combination of the foregoing.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers, databases, and personal computing devices in the figures may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used m the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A computer-implemented method for information capture, analysis and automated decision making, compiling real-time and historic inputs from varied sources, both human and calculated, including real-world and digitally-generated facts and opinions in connection with an event as the event is taking place, the method comprising:

providing a user interface for a personal computing device, wherein the user interface enables a user to identify at least one event that the user will observe and to provide one or more of a real-time publication and a response to a published text, image, video, audio statement, question or fact in connection with the at least one event as the event is taking place, wherein the user interface is designed to perform one or more of publish and receive event-automated and peer-to-peer-user-generated, published information in real-time and facilitate real-time publications and responses from the user in the form of unstructured text, image, video and audio and a selected response from a set of options; wherein the user interface is designed to publish and receive user statements or automated statements for which group of users can respond;

receiving the user's identification as to the at least one event that the user will observe;

receiving the user's one or more of a real-time publication and response to the information published in connection with the event;

for the user's one or more of a real-time publication and response, recording response and publication content, response and publication timing, biological output and a user location;

compiling the user's one or more of a real time publication and response with real time publications and responses from other users in a group of users to generate aggregated response statistics;

distributing the aggregated response statistics to the users in the group of users;

distributing the aggregated response statistics in real-time to the user of the information published in connection with the event;

analyzing the response statistics based on a comparison of one or more of real-time, user-specific publication and response actions, and varied event-based, human-based and historic-fact based inputs;

determining one or more targeted communications for the user based on the real-time information capture and analysis; and sending the real-time targeted communication during the event, to the user.

2. The method of claim 1, further comprising the steps of retrieving user profile data;

calculating the real-time statistics for the user based also on the user profile data;

generating a real-time purchasing preference, wherein the real-time purchasing preference comprises a calculated statistical preference toward a type of product or service; and wherein the targeted communication comprises an advertisement based on the real-time purchasing preference.

3. The method of claim 1, further comprising recording response intensity for the user's real-time responses.

4. The method of claim 1, wherein the personal computing device comprises a mobile phone, virtual reality goggles, a television, a watch, or other personal computing device.

5. The method of claim 4, wherein the at least one event is a live event and the user attends the at least one event in person.

6. The method of claim 5, wherein the user does not attend the at least one event in person, and the method further comprises the step of transmitting real-time event content to the user's personal computing device.

7. The method of claim 6, wherein the real-time event content comprises at least one of video and audio.

* * * * *